United States Patent Office 3,439,059
Patented Apr. 15, 1969

3,439,059
PROCESS FOR THE PRODUCTION OF DIVINYL-BENZENES FROM DIACETYLBENZENES
Ninel Iosifovna Yakovich, Tverskaya Yamskaya ul. 6, kv. 108; Khachik Egorovich Khcheyan, Prospekt Mira 118-a, kv. 190; Larisa Borisovna Izrael, ul. Gertsent 50/5, kv. 28; Alexei Fedorovich Pavlichev, Nikitinskaya ul. 6, kv. 13; and Nina Nikolaevna Kondtratieva, ul. Alymova 29, kv. I, all of Moscow, U.S.S.R.
No Drawing. Filed Jan. 2, 1968, Ser. No. 694,822
Int. Cl. C07c *15/10, 1/22, 1/24*
U.S. Cl. 260—669     12 Claims

ABSTRACT OF THE DISCLOSURE

A process for converting diacetylbenzenes to divinylbenzenes in a single-stage reaction in the presence of an alcohol and a MgO-MgSO$_4$ catalyst at a temperature of 250–400° C.

---

This invention relates to processes for the production of high-purity divinylbenzenes.

Divinylbenzene finds extensive application in industry as a copolymer for the manufacture of ion exchange resins, dielectric materials, and semiconductors. Preparation of semiconductors calls for the employment of high-purity individual isomers of divinylbenzene, whilst the purity of divinylbenzene intended for the manufacture of resins should be 45–50% or better.

The currently employed industrial method of manufacturing divinylbenzene involves catalytic dehydrogenation of diethylbenzene, the catalysate thus obtained being a mixture of 20–25% of divinylbenzene isomers with styrene, ethylvinylbenzene and other impurities, so that isolation of divinylbenzene from said mixture presents considerable difficulties.

A three-stage process for the preparation of high-purity individual isomers of divinylbenzene and mixtures thereof has been developed by the present authors.

The above process involves the oxidation of diethylbenzene to diacetylbenzene, followed by reducing the diacetylbenzene obtained to bis(-hydroxyethyl) benzene, and subjecting the latter compound to dehydration to yield the sought-for divinylbenzene.

This process makes it possible to obtain the product compound containing 96–97 wt. percent of divinylbenzenes, but suffers from the drawback of being a three-stage method.

It is an object of the present invention to provide a single-stage process for the manufacture of high-purity divinylbenzenes.

This object is accomplished by the provision of a process which comprises, according to the invention, reacting diacetylbenzenes with a primary or secondary alcohol at a temperature of 250–400° C., preferably at 300–360° C., and in the presence of a mixed magnesia-magnesium sulfate catalyst, the reaction being carried out in one stage.

The reaction may be carried out either at atmospheric pressure or in vacuum. It is expedient to accomplish the process in the atmosphere of a gas that is inert to the reaction mixture, e.g., in a nitrogen or carbon dioxide atmosphere. The alcohol employed as a reducing agent may be selected from the group consisting of ethyl, isopropyl, butyl, and cyclohexanol alcohols. However, the best results are obtained when isopropyl alcohol is used as the reducing agent, the alcohol-to-diacetylbenzene molar ratio being in the 4:1 to 10:1 range, preferably in the 6:1 to 8:1 range.

Described hereinbelow is the procedure employed for preparing the catalyst to be used in the process, according to the present invention. A solution of magnesium sulfate is mixed with a solution of alkaline metal hydroxide, such as potassium or sodium hydroxide, the solutions being taken in a proportion that makes it possible to convert at least half of the magnesium sulfate to magnesium hydroxide. The reaction should preferably be carried out at an elevated temperature. The magnesium hydroxide precipitate thus formed is separated, washed with water, subjected to drying, preferably at a temperature of 100–120° C., and thereafter comminuted and calcined at a temperature of 250–450° C., preferably at 300–400° C., to convert magnesium hydroxide to magnesia. It is good practice to carry out calcination initially in a stream of air and then under vacuum.

The catalyst prepared as disclosed hereinabove is noted for its high selectivity, so that its application involves practically no dehydration of the alcohol used as reducing agent. This is evidenced by the fact that the loss of isopropyl alcohol used in the present process does not exceed 3–5%.

The reaction between diacetylbenzene and isopropyl alcohol proceeds according to the following equation:

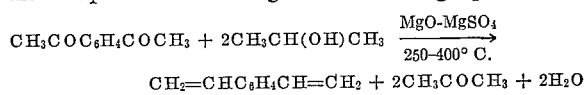

$$CH_3COC_6H_4COCH_3 + 2CH_3CH(OH)CH_3 \xrightarrow[250\text{--}400°\ C.]{MgO\text{-}MgSO_4}$$

$$CH_2{=}CHC_6H_4CH{=}CH_2 + 2CH_3COCH_3 + 2H_2O$$

The yield of divinylbenzene is at least 80% based on the diacetylbenzene used, the purity of undistilled divinylbenzene equals 95–96%, but vacuum distillation is conducive to obtaining divinylbenzene of 98% purity.

The present process not only makes possible the preparation of individual isomers of divinylbenzene, viz., m-divinylbenzene and p-divinylbenzene, but is likewise instrumental in preparing divinylbenzene isomer mixtures, provided the feed stock is comprised of a diacetylbenzene isomer mixture.

The process of the present invention, therefore, renders it possible to prepare high-purity divinylbenzenes in a good yield and by a single-stage procedure, an added advantage being that reducing agent losses are practically absent.

Example I.—Preparation of m-divinylbenzene

To prepare the catalyst used in the present process, recourse is had to the following procedure.

Into a 1-l. flask fitted with a thermometer, a condenser, and a stirrer are charged 240 g. of MgSO$_4$·7H$_2$O and 480 ml. of distilled water. The contents of the flask are stirred to attain compete dissolution of the magnesium sulfate, followed by adding 120 g. of a 50% aqueous solution of sodium hydroxide.

The flask is then placed on a boiling water bath and the contents of the flask are heated, with constant stirring, for a period of 3 hours, followed by evaporating the solution, cooling it, and filtering on a Büchner funnel. The precipitate is washed with distilled water, dried at 100–120° C., comminuted to obtain grains from 3 to 5 mm. in dia., and calcined at a temperature of 300–400° C. first in a stream of air and thereafter under vacuum.

Into a reaction vessel are charged 50 g. of the catalyst prepared in accordance with the above procedure, and thereto is added a solution of 5 g. m-diacetylbenzene in 40 g. of isopropyl alcohol (diacetylbenzene-to-alcohol ratio, 1:8).

In the reaction vessel, the temperature is maintained at 350° C., the residual pressure being 50 mm. mercury.

On distilling off the alcohol from the reaction mixture, the yield of 95.0% pure m-divinylbenzene equals 3.5 grams.

The impurities present in the product compound consists of unreacted m-diacetylbenzene and m-dicarbinol (ca. 1.5%).

The yield of m-divinylbenzene is 80% based on the diacetylbenzene used.

Distillation at a pressure of 2 mm. mercury gives m-divinylbenzene of 98% purity (index of refraction, $n_D^{20}$ 1.5760; reported in the literature, $n_D^{20}$ 1.5764).

Example II.—Preparation of p-divinylbenzene

A solution of 5 g. p-diacetylbenzene in 50 g. isopropyl alcohol preheated to a temperature of 50° C. is fed into a reaction vessel containing the catalyst prepared as disclosed in Example I. The reaction is carried out by following the procedure of Example I.

Obtained are 3.6 g. of the product containing 96%-pure p-divinylbenzene (86% yield based on the starting diacetylbenzene).

Vacuum distillation results in the isolation of 98%-pure divinylbenzene; $n_D^{20}$ 1.5805 ($n_D^{20}$ 1.5820 is reported in the literature).

We claim:

1. A process for the production of high-purity divinylbenzenes which comprises a single-stage reaction of diacetylbenzenes with an alcohol in the presence of a catalyst consisting of MgO and MgSO₄, at a temperature of 250–400° C.

2. A process according to claim 1, wherein the reaction is carried out at a temperature of 320–360° C.

3. A process according to claim 1, wherein the reaction is carried out in vacuum.

4. A process according to claim 1, wherein the reaction is carried out in a stream of gas that is inert towards the reaction mixture.

5. A process according to claim 1, wherein the alcohol-to-diacetylbenzene molar ratio is in the range of 4:1 to 10:1.

6. A process according to claim 1, wherein the alcohol-to-diacetylbenzene molar ratio is in the 6:1 to 8:1 range.

7. A process according to claim 1, wherein the alcohol used is isopropyl alcohol.

8. A process according to claim 1, wherein the catalyst used is prepared by mixing a solution of magnesium sulfate and solution of alkaline metal hydroxide taken in a proportion sufficient to convert at least half of the magnesium sulfate to magnesium hydroxide, followed by drying the catalyst obtained and calcining it at a temperature of 250–450° C.

9. A process according to claim 8, wherein the catalyst is calcined at a temperature of 300–400° C.

10. A process according to claim 9, wherein calcination is carried out initially in a stream of air and thereafter in vacuum.

11. A process according to claim 1, wherein p-diacetylbenzene is used as a starting material for the manufacture of high-purity p-divinylbenzene.

12. A process according to claim 1, wherein m-diacetylbenzene is used as the starting material for the manufacture of high-purity m-divinylbenzene.

References Cited

UNITED STATES PATENTS

| | | | |
|---|---|---|---|
| 3,153,102 | 10/1964 | Bochstahler et al. | 260—669 |
| 3,375,289 | 3/1968 | Khehejan et al. | 260—669 |

DELBERT E. GANTZ, *Primary Examiner.*

C. R. DAVIS, *Assistant Examiner.*